US 8,809,743 B2

(12) United States Patent
Suzuki et al.

(10) Patent No.: US 8,809,743 B2
(45) Date of Patent: *Aug. 19, 2014

(54) HEATER WITH TEMPERATURE DETECTING DEVICE, BATTERY STRUCTURE WITH HEATER, AND HEATER UNIT

(75) Inventors: Masahiko Suzuki, Hoi-gun (JP); Jun Okuda, Aichi-gun (JP); Yukie Uemura, Toyohashi (JP); Kunio Kanamaru, Okazaki (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 675 days.

This patent is subject to a terminal disclaimer.

(21) Appl. No.: 12/068,726

(22) Filed: Feb. 11, 2008

(65) Prior Publication Data

US 2008/0198897 A1 Aug. 21, 2008

(30) Foreign Application Priority Data

Feb. 19, 2007 (JP) ................................. 2007-037987

(51) Int. Cl.
*H05B 3/00* (2006.01)
*H01M 10/48* (2006.01)
*H01M 10/50* (2006.01)
*G01K 13/10* (2006.01)
*G01K 13/00* (2006.01)
*B32B 5/00* (2006.01)

(52) U.S. Cl.
CPC ............ *G01K 13/00* (2013.01); *H01M 10/486* (2013.01); *H01M 10/5026* (2013.01); *G01K 13/10* (2013.01); *H01M 10/5016* (2013.01); *H01M 10/5004* (2013.01); *H01M 10/5083* (2013.01); *H01M 10/5006* (2013.01); *H01M 10/5067* (2013.01); *Y02E 60/12* (2013.01)
USPC .............................. 219/209; 29/611; 156/179

(58) Field of Classification Search
USPC ......... 219/209, 511, 544, 548, 528, 549, 543; 29/611; 156/179
See application file for complete search history.

(56) References Cited

U.S. PATENT DOCUMENTS 2,458,184 A * 1/1949 Marick ......................... 219/536
(Continued)

FOREIGN PATENT DOCUMENTS

| JP | Y-37-002256 | 7/1960 |
| JP | A-55-039303 | 3/1980 |
| JP | U-60-057104 | 4/1985 |

(Continued)

OTHER PUBLICATIONS

English translation of Dec. 6, 2011 Office Action issued in JP Application No. 2007-037987.

*Primary Examiner* — Shawntina Fuqua
(74) *Attorney, Agent, or Firm* — Oliff PLC

(57) ABSTRACT

There are provided a heater with temperature detecting device capable of accurately detecting the temperature of a laminated sheet heater (the temperature of a heater element) by a temperature detecting device, a battery structure provided with this heater with temperature detecting device, and a heater unit. A first heater with temperature detecting device includes a first laminated sheet heater and a temperature detecting device. In this first heater, a first metal sheet includes a part protruding outward in a lamination direction of a laminated heater to provide at least part of an accommodation space in which the temperature detecting device is accommodated.

15 Claims, 15 Drawing Sheets

(56) References Cited

U.S. PATENT DOCUMENTS

| | | | | |
|---|---|---|---|---|
| 3,110,633 | A | * | 11/1963 | Bachmann ................ 219/200 |
| 4,860,434 | A | * | 8/1989 | Louison et al. ............. 29/611 |
| 5,542,489 | A | * | 8/1996 | Allison et al. ............ 180/68.5 |
| 6,415,104 | B1 | * | 7/2002 | Fitts et al. ................. 392/503 |
| 2004/0195234 | A1 | * | 10/2004 | Kaesler ..................... 219/548 |

FOREIGN PATENT DOCUMENTS

| | | |
|---|---|---|
| JP | U 60-192367 | 12/1985 |
| JP | U-63-089695 | 6/1988 |
| JP | A-2003-208968 | 7/2003 |
| JP | A 2004-355882 | 12/2004 |
| JP | A 2004-356087 | 12/2004 |

* cited by examiner

HEATER WITH TEMPERATURE DETECTING DEVICE, BATTERY STRUCTURE WITH HEATER, AND HEATER UNIT

BACKGROUND OF THE INVENTION

1. Field of the Invention

The present invention relates to a heater with temperature detecting device, which includes a thin laminated sheet heater and a temperature detecting device; a battery structure including the heater with temperature detecting device; and a heater unit.

2. Description of Related Art

In some of heaters provided with a temperature detecting device (a temperature sensor or the like) to detect the temperature of the heater, the temperature detecting device is fixed to the surface of the heater.

JP2004-356087A discloses a heater including a base, a heating element (a heater element) placed on the base, and a fixing material provided on the base so as to cover the heating element. A first embodiment of JP '087A teaches a heater with a temperature detecting device (a temperature sensor) embedded together with the heating element in the fixing material.

Recently, there are increasing demands for reduction in thickness of heaters. Accordingly, a laminated film heater including a heater element formed of metal foil in a predetermined pattern and two insulating resin films (polyimide film or the like) between which the heater element (see JP2004-355882A) is interposed.

This laminated film heater is used to for example heat a battery under a low temperature condition to improve output characteristics of the battery. To be concrete, there has been proposed a technique in which a laminated film heater is attached to the bottom of a battery for vehicle to heat by use of a household power source (see JP60(1985)-192367U).

Meanwhile, the aforementioned laminated film heater which has the surface made of the insulating resin film would be apt to cause large unevenness of surface temperature. This results in a problem that a body to be heated (a battery for vehicle and others) could not be heated uniformly. To solve this problem, recently, a laminated sheet heater has been proposed in which a metal sheet is laminated on an outer surface of an insulating resin film. Since the metal sheet is more superior in heat conductivity than the insulating resin film, such laminated sheet heater can reduce the heating unevenness.

On the other hand, the above laminated sheet heater has been required to include a temperature detecting device for detecting the temperature of the heater. However, if the temperature detecting device (a temperature sensor or the like) is fixed to the surface of the laminated heater, the temperature detecting device will be cooled by outside air, leading to incorrect detection of the heater temperature.

Further, the laminated sheet heater is very thin and hence it does not allow the temperature detecting device to be embedded in the fixing material or the like together with the heater element (heating element) as shown in the first embodiment of JP '087A.

BRIEF SUMMARY OF THE INVENTION

The present invention has been made in view of the above circumstances and has an object to provide: a heater with temperature detecting device capable of accurately detecting the temperature of a laminated sheet heater (the temperature of a heater element) by the temperature detecting device; a battery structure provided with the heater with temperature detecting device; and a heater unit.

To achieve the above object, the present invention provides a heater with temperature detecting device comprising: a laminated sheet heater including: a first insulating resin film; a second insulating resin film; a heater element made of metal foil, the heater element being interposed between an inner surface of the first insulating resin film and an inner surface of the second insulating resin film; and a first metal sheet laminated on an outer surface of the first insulating resin film; and a temperature detecting device, wherein the first metal sheet includes a part protruding outward in a direction of lamination of the laminated heater to provide at least part of an accommodation space in which the temperature detecting device is accommodated.

In the heater with temperature detecting device according to the present invention, the first metal sheet includes the part protruding outward in the lamination direction of the laminated heater, forming at least part of the accommodation space in which the temperature detecting device is accommodated. In other words, part of the first metal sheet constituting the laminated sheet heater is formed to protrude outward in the lamination direction of the laminated heater, so that the temperature detecting device can be placed in the laminated sheet heater (in the accommodation space). The temperature detecting device accommodated in the laminated sheet heater (in the accommodation space) as above is unlikely to be cooled by outside air or the like. Accordingly, in the heater with temperature detecting device of the present invention, the temperature of the laminated sheet heater (the temperature of the heater element) can be detected accurately by the temperature detecting device.

For example, the temperature detecting device may include an excessive temperature rise preventing device such as a thermal fuse and a PTC thermistor. In the heater with temperature detecting device of the present invention, including the excessive temperature rise preventing device, the temperature of the laminated heater can be detected accurately by the excessive temperature rise preventing device. If the temperature of the laminated heater excessively rises, this excessive temperature rise preventing device can interrupt (or reduce) energization to the heater. This makes it possible to prevent the excessive temperature rise of the laminated heater.

Further, as the temperature detecting device, a temperature sensor having a temperature detecting element (a thermistor and a thermocouple) may be provided. The heater with temperature detecting device of the present invention including the temperature sensor as the temperature detecting device can detect the temperature of the laminated heater accurately.

In the above heater with temperature detecting device, preferably, the laminated heater includes a second metal sheet laminated on an outer surface of the second insulating resin film.

In any one of the above heaters with temperature detecting device, preferably, the accommodation space includes a through hole formed through a film heater part in which the first insulating resin film, the second insulating resin film, and the heater element are laminated.

In the above heater with temperature detecting device, preferably, the accommodation space includes a first opening formed in an outer surface of the second insulating resin film, and the heater with temperature detecting device further comprises a closing member that closes the first opening.

For example, the closing member may include a metal sheet, a metal adhesive tape comprised of a metal film and an adhesive layer, and a resin adhesive tape comprised of a resin film and an adhesive layer. Further, the heater with temperature detecting device of the present invention also includes the heater with temperature detecting device including the second metal sheet, in which the accommodation space includes the through hole formed through only the film heater part, of the film heater part and the second metal sheet. The second metal sheet of this heater with temperature detecting device corresponds to the closing member.

In any one of the above heaters with temperature detecting device, preferably, the accommodation space includes a through hole formed through the second metal sheet and a film heater part in which the first insulating resin film, the second insulating resin film, and the heater element are laminated.

In the above heater with temperature detecting device, preferably, the accommodation space includes a first opening formed in an outer surface of the second metal sheet, and the heater with temperature detecting device further comprises a closing member that closes the first opening.

In any one of the above heaters with temperature detecting device, preferably, the temperature detecting device is accommodated in the accommodation space in such a way as to be in contact with the first metal sheet.

In the above heater with temperature detecting device, preferably, the temperature detecting device is fixed in contact with the first metal sheet in the accommodation space.

In any one of the above heaters with temperature detecting device, preferably, the temperature detecting device is accommodated in contact with at least one of the first metal sheet and the second metal sheet in the accommodation space.

In the above heater with temperature detecting device, preferably, the temperature detecting device is fixed in contact with at least one of the first metal sheet and the second metal sheet in the accommodation space.

In any one of the above heaters with temperature detecting device, preferably, the temperature detecting device includes: a main body including a temperature detecting element; and an elastic coating that has heat conductivity and elasticity and coats the main body, wherein the elastic coating is elastically deformed in a compressive state to fix the temperature detecting device in the accommodation space.

The elastic coating of the temperature detecting device is preferably made of for example silicone rubber having good heat conductivity and elasticity.

In any one of the above heaters with temperature detecting device, preferably, the accommodation space includes a second opening formed to open in a direction perpendicular to the lamination direction, and the heater with temperature detecting device further comprises a lead wire electrically connected to the temperature detecting device and placed extending out of the accommodation space through the second opening; and a sealing member that seals the second opening.

For example, the sealing member may include a rubber material and a resin material.

According to another aspect, the present invention provides a battery structure with heater, comprising: a battery structure including a power generating element and having a surface to be heated; and a heater for heating the surface to be heated, thereby heating the power generating element, wherein the heater is one of the above heaters with temperature detecting device.

The battery structure with heater of the present invention is provided with any one of the above heaters with temperature detecting device. In one of the above heaters with temperature detecting device, as mentioned above, the temperature detecting device can detect the temperature of the laminated heater accurately. In the battery structure with heater of the present invention, the temperature detecting device is preferably utilized to control the temperature of the laminated heater, so that the battery structure can be heated appropriately.

To be specific, the battery structure with heater, including the excessive temperature rise preventing device (e.g. a thermal fuse, a PTC thermistor, etc.) as the temperature detecting device can interrupt (or reduce) energization to the heater by use of the excessive temperature rise preventing device appropriately when the temperature of the laminated heater excessively rises. This makes it possible to appropriately prevent the excessive temperature rise of the laminated heater and hence prevent excessive temperature rise of the battery structure.

As to the battery structure with heater, provided with the temperature sensor (including a thermistor, a thermocouple, etc.) as the temperature detecting device, energization to the laminated heater (ON-OFF control or the like) is preferably conducted based on a detection signal outputted from the temperature sensor, thereby appropriately heating the battery structure.

The battery structure may include for example a cell including a single power generating element housed in a battery case. Further, the battery structure includes a battery module provided with a battery case integrally provided with a plurality of compartments in each of which a power generating element is accommodated. The battery structure also includes a battery pack in which a plurality of cells or battery modules are connected in series or in parallel and held in a housing, holder frame, or the like.

The power generating element is a constituent element of a battery for providing battery functions (charging, discharging, etc.). For example, it includes a positive plate, a negative plate, a separator, and an electrolyte.

In the above battery structure with heater, preferably, the surface to be heated of the battery structure includes: a flat part to be heated; and a recess depressed into the battery structure, wherein the heater with temperature detecting device is arranged such that the part of the first metal sheet protruding outward in the lamination direction is accommodated in the recess of the surface to be heated, and an outer surface of the first metal sheet is placed in contact with the flat part to be heated.

Furthermore, according to another aspect, the present invention provides A heater unit comprising: a thin sheet heater; and a holding member that holds the heater, the heater unit being arranged to heat a battery structure provided with a power generating element to heat the power generating element, wherein the heater is one of the above heaters with temperature detecting device, and the holding member is configured to mount the heater unit to the battery structure.

Since the heater unit of the present invention includes any one of the aforementioned heaters with temperature detecting device, the temperature of the laminated sheet heater (the temperature of the heater element) can be detected accurately by the temperature detecting device.

Furthermore, the heater unit of the present invention is mountable to the battery structure by the holding member. Accordingly, with the holding member, the heater with temperature detecting device can be easily attached to the battery structure, thus allowing appropriate heating of the power generating element of the battery structure.

Further, preferably, the present invention provides a heater unit comprising a sheet heater and a holding member that holds the heater, the heater unit being arranged to heat a battery structure including a power generating element and thereby heat the power generating element, in which the heater is the heater with temperature detecting device according to claim 3 or 5, and the holding member is arranged to mount the heater unit to the battery structure, the accommodation space of the heater with temperature detecting device includes a first opening formed in one of an outer surface of the second insulating resin film and an outer surface of the second metal sheet, the first opening is closed directly by the holding member or indirectly by the holding member through another member.

Since this heater unit includes the heater with temperature detecting device according to claim 3 or 5, the temperature of the laminated sheet heater (the temperature of the heater element) can be detected accurately by the temperature detecting device. In addition, as mentioned above, the thickness of the heater with temperature detecting device can be reduced and hence the thickness of the heater unit can also be reduced. The holding member is arranged to mount the heater unit to the battery structure. With this holding member, accordingly, the heater with temperature detecting device can be easily mounted to the battery structure.

The heater unit of the present invention is provided with the heater with temperature detecting device including the first opening. Further, this first opening is closed directly by the holding member or indirectly by the holding member through another member. This makes it possible to prevent outside air or the like from entering the accommodation space through the first opening, thereby preventing the temperature detecting device from being cooled by the outside air or the like. It is further possible to prevent water droplets or the like from entering the accommodation space through the first opening, thereby preventing short of the temperature detecting device and others. It is also possible to prevent the temperature detecting device placed in the accommodation space from becoming damaged through the first opening by a mounting tool or the like in the mounting work of the heater unit.

Furthermore, in any one of the aforementioned heater units, preferably, the holding member is arranged to be mount/demount the heater unit to the battery structure.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a battery structure with heater 10 (hereinafter, referred to as a "heater-equipped battery structure") embodying the present invention will now be given referring to the accompanying drawings.

Figure 1:
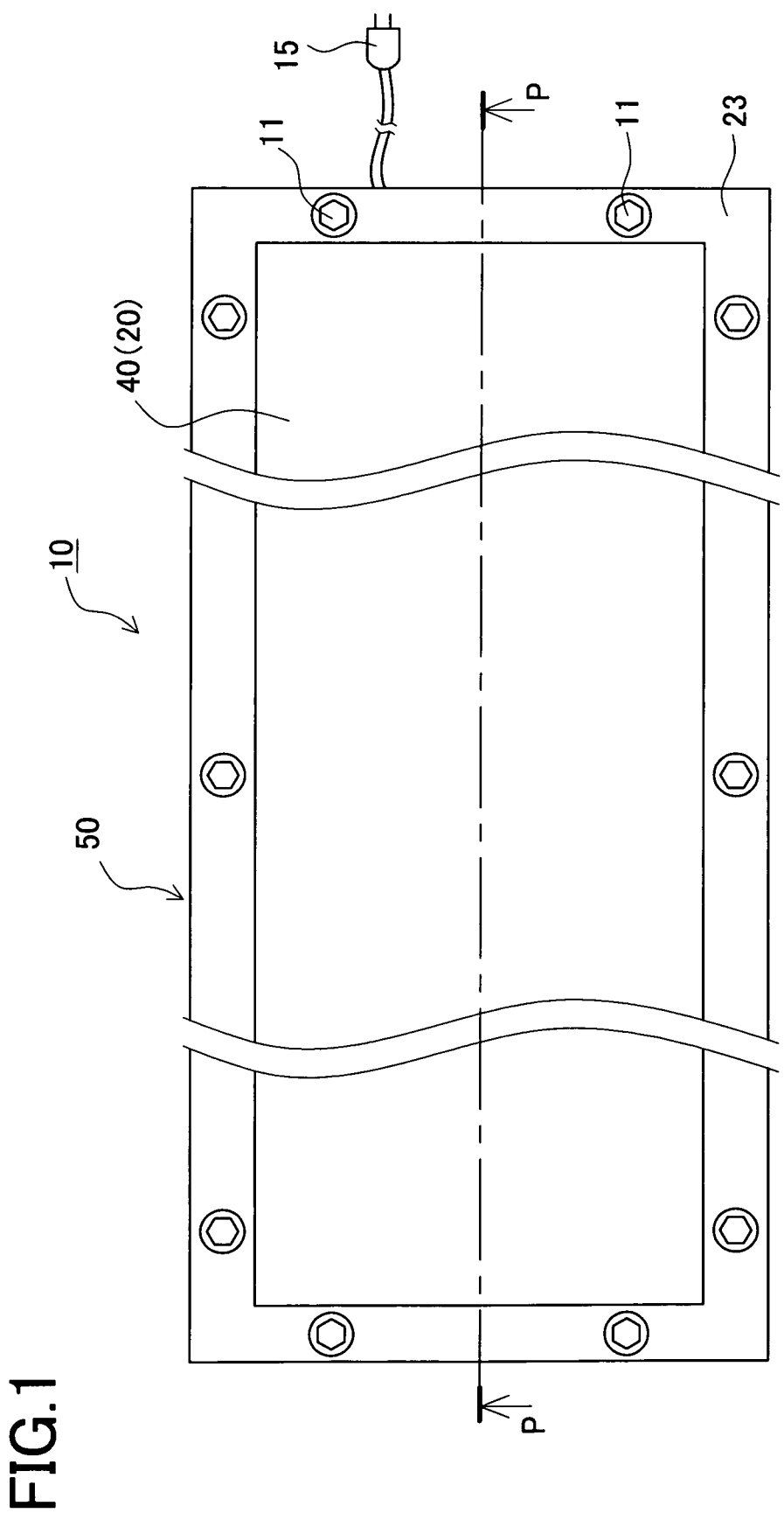
FIG. 1 is a top view of a battery structure with heater in a preferred embodiment.
Figure 2:
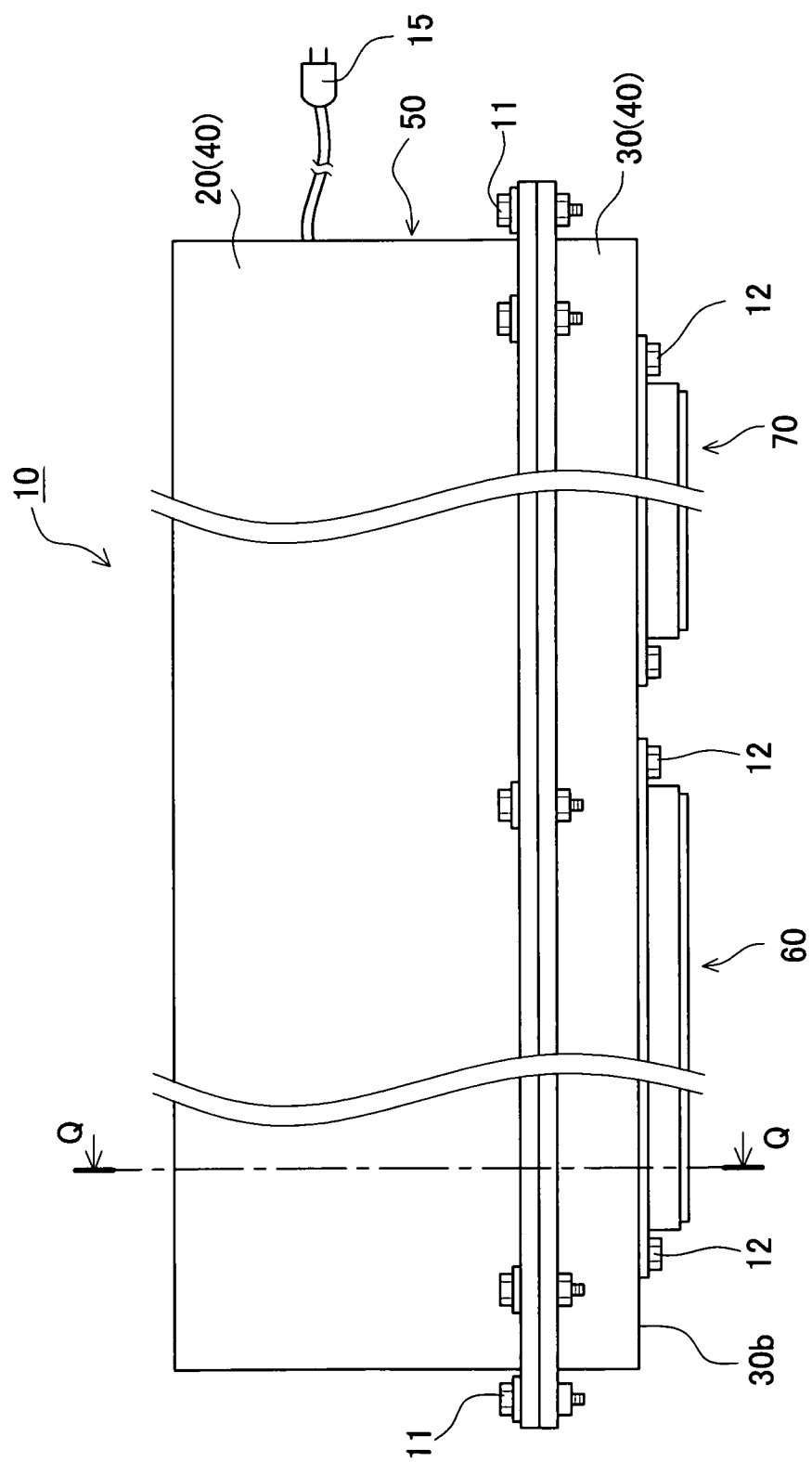
FIG. 2 is a side view of the battery structure with heater in the embodiment.

The heater-equipped battery structure 10 includes a battery pack 50, a first heater unit 60, and a second heater unit 70 as shown in FIGS. 1 and 2.

Figure 3:
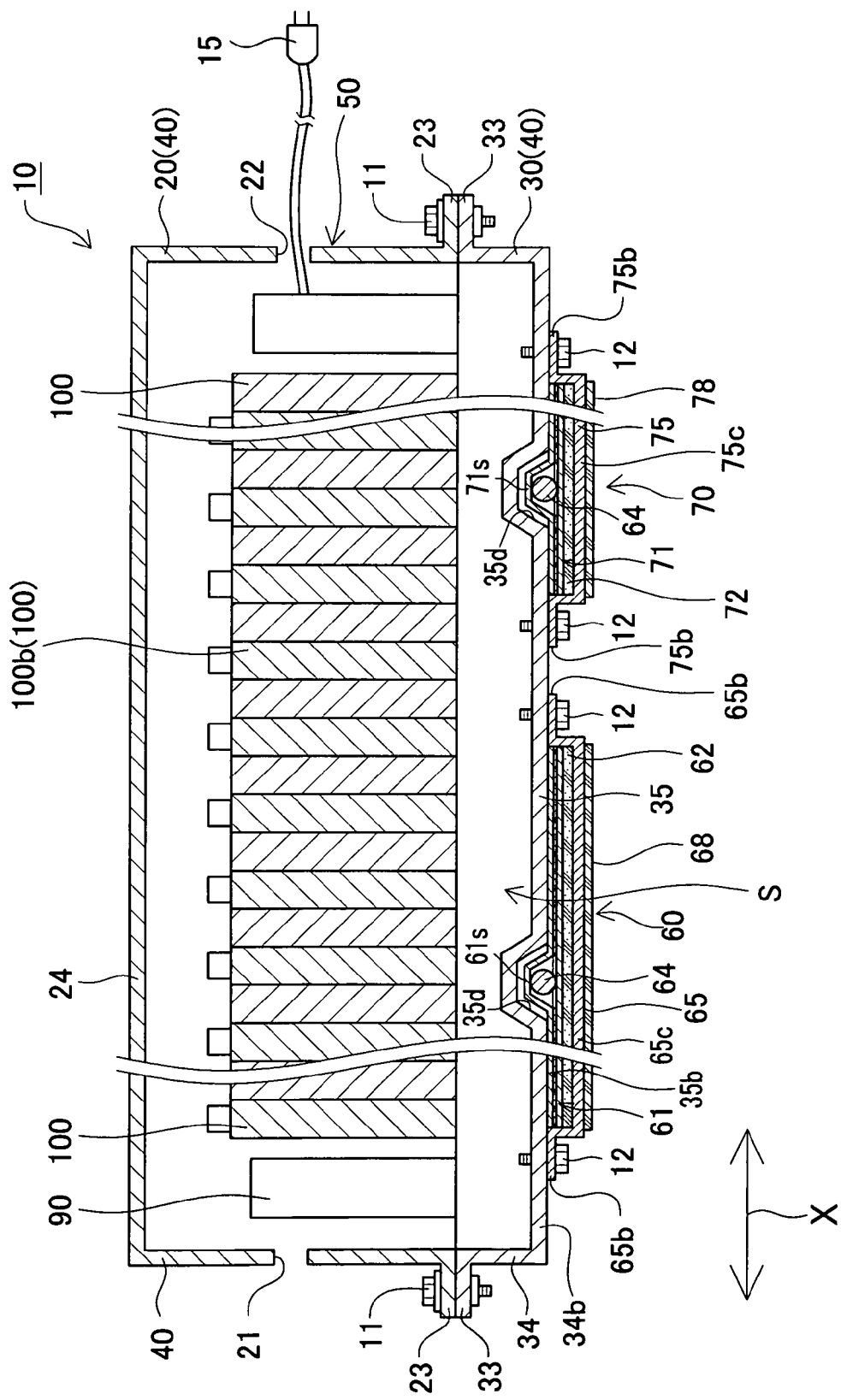
FIG. 3 is a sectional view of the battery structure with heater in the embodiment, taken along a line P-P in FIG. 1.

As shown in FIG. 3, the battery pack 50 includes a housing case 40 constituted of a first housing member 20 and a second housing member 30 and a plurality of secondary batteries 100 (fourth batteries in the present embodiment) arranged in the housing case 40. The battery pack 50 in the present embodiment corresponding to a battery structure.

Figure 4:
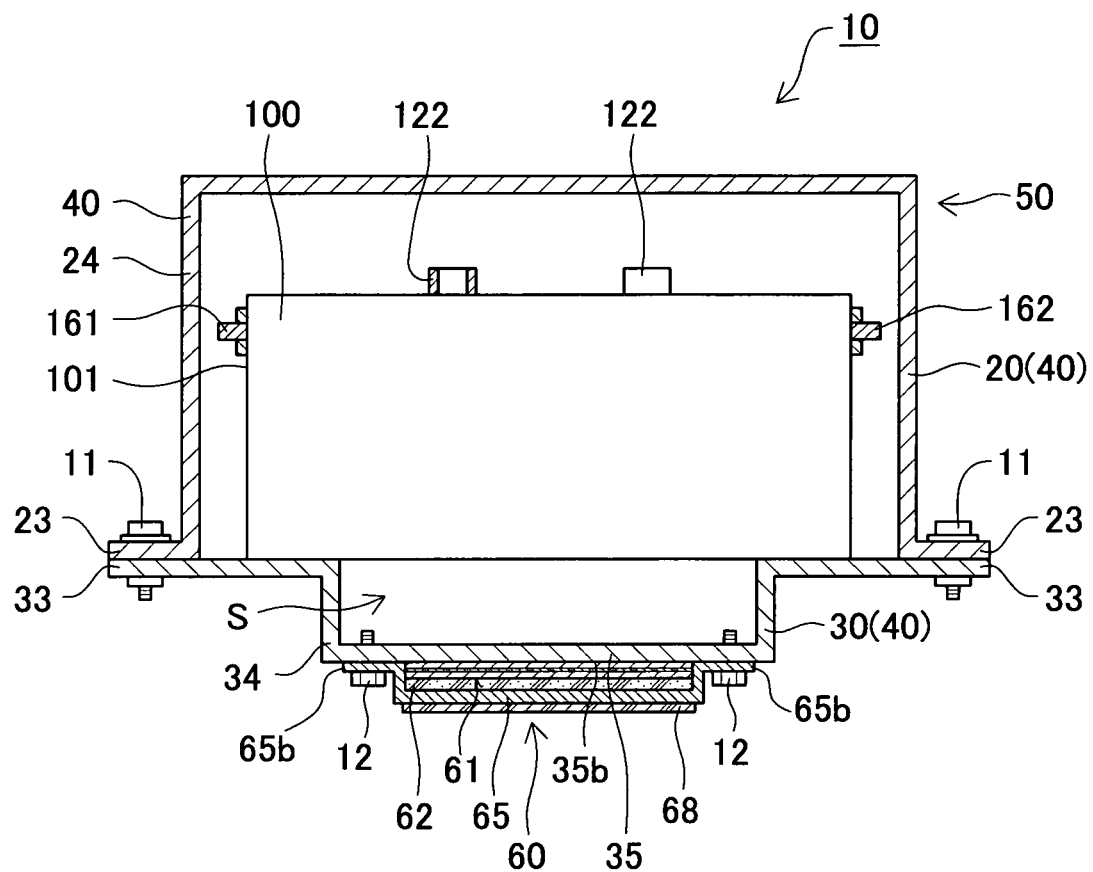
FIG. 4 is a sectional view of the battery structure with heater in the embodiment, taken along a line Q-Q in FIG. 2.
Figure 5:
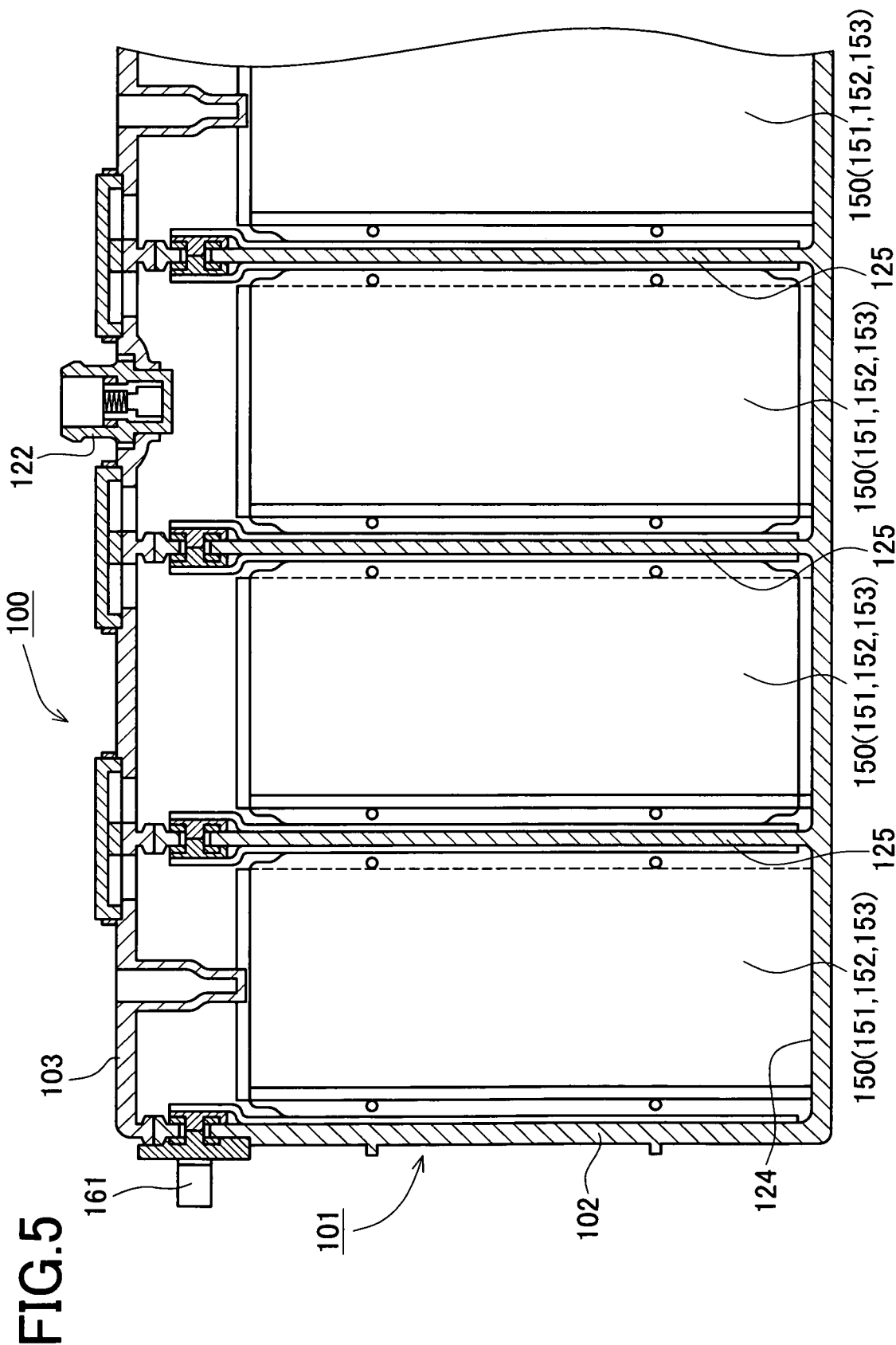
FIG. 5 is a sectional view of a secondary battery in the embodiment.

Each secondary battery 100 is a nickel-metal hydride storage sealed battery provided with a battery case 101, a positive terminal 161 and a negative terminal 162, as shown in FIG. 4. The battery case 101 has a resin case body 102 of a nearly rectangular box shape and a resin cover 103 of a nearly rectangular plate shape as shown in FIG. 5. The case body 102 is internally divided into six compartments 124 by partition walls 125. Each compartment 124 accommodates an electrode plate group 150 (positive electrode plates 151, negative electrode plates 152, and separators 153) and an electrolyte (not shown). The electrode plate groups 150 are individually accommodated in the compartments 124 are connected in series to one another. Thus, the secondary battery 100 of the present embodiment constitutes a battery module including six cells connected in series.

The electrode plate group 150 and the electrolyte (not shown) correspond to a power generating element. The cover 103 is provided with a safety valve 122. In the present embodiment, as shown in FIG. 3, forty secondary batteries 100 configured as above are arranged in a row in a row direction X (a lateral direction in FIG. 3) and connected in series to one another.

The first housing member 20 is made of metal in rectangular recessed form which includes a housing section 24 in which the secondary batteries 100 are housed and a rectangular annular flange 23 formed around an open end of the housing section 24. The second housing member 30 includes a rectangular recessed part 34 made of metal and a rectangular annular flange 33 formed around an open end of the recessed part 34.

The secondary batteries 100 are fixedly mounted on the flange 33 of the second housing member 30 (see FIGS. 3 and 4). Further, the first housing member 20 is secured to the second housing member 30 with mounting bolts 11 while the flange 23 abuts against the flange 33 of the second housing member 30 to house the plurality of secondary batteries 100 in the housing section 24. In this battery pack 50, of a bottom wall 34b of the recessed part 34 of the secondary housing member 30, the portion located with a space S from the secondary batteries 100 is referred to as a spaced part 35. In the present embodiment, therefore, the outer surface of the spaced part 35 forms a surface 35b to be heated (hereinafter, referred to as a "heated surface 35b").

Figure 6:
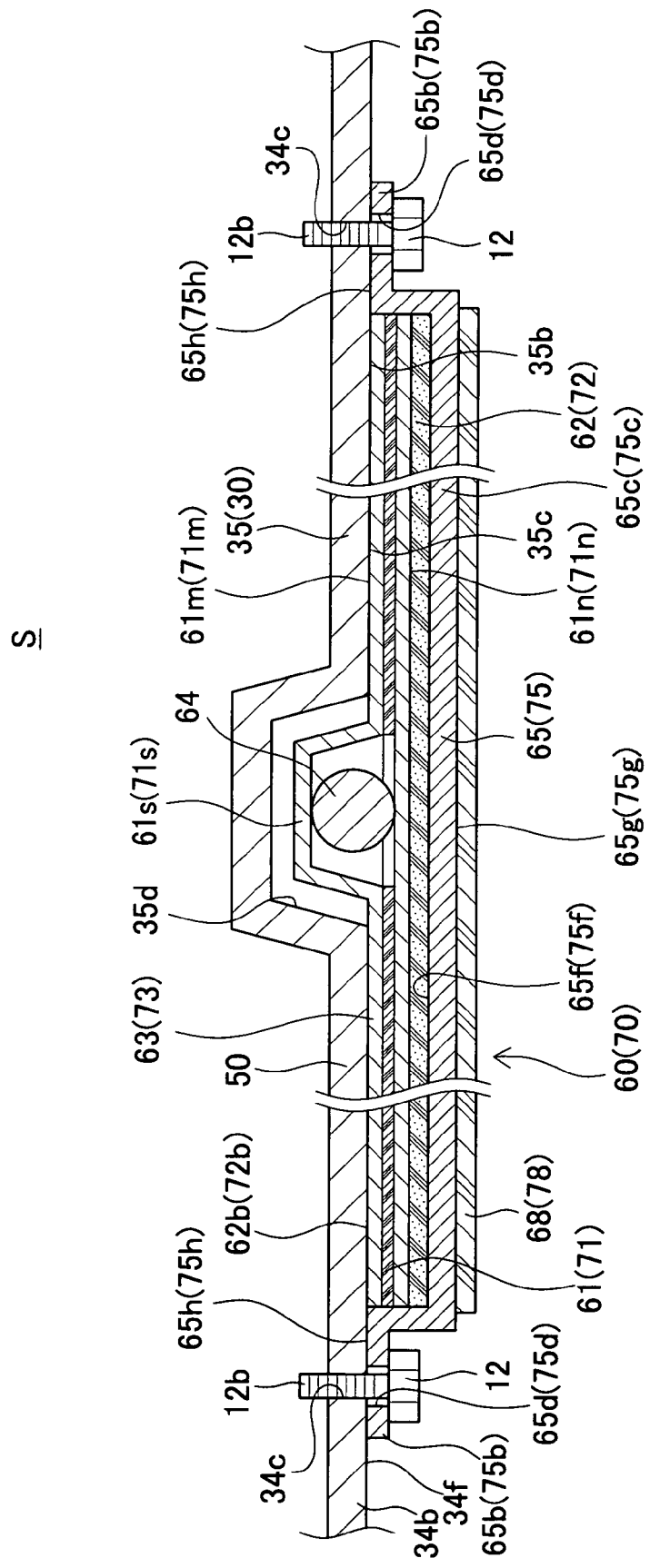
FIG. 6 is a sectional view of a first heater unit (a second heater unit)

The first heater unit 60 includes, as shown in FIG. 6, a first heater with temperature detecting device (hereinafter, referred to as a "first heater") 63, a first sheet 62, a first holding member 65 that holds them, and a heat insulating member 68. The first heater 63 is bonded to an upper surface 62b of the first sheet 62 which is bonded to a holding surface 65f of the first holding member 65. The heat insulating member 68 is bonded to a surface 65g (a lower surface in FIG. 6) of the first holding member 65 opposite the holding surface 65f. Thus, the first heater unit 60 is constituted of the first heater 63, the first sheet 62, the first holding member 65, and the heat insulating member 68 which are integrally bonded to one another.

The first heater 63 includes a first laminated sheet heater 61 (see FIG. 7) and a columnar temperature detecting device 64.

Figure 8:
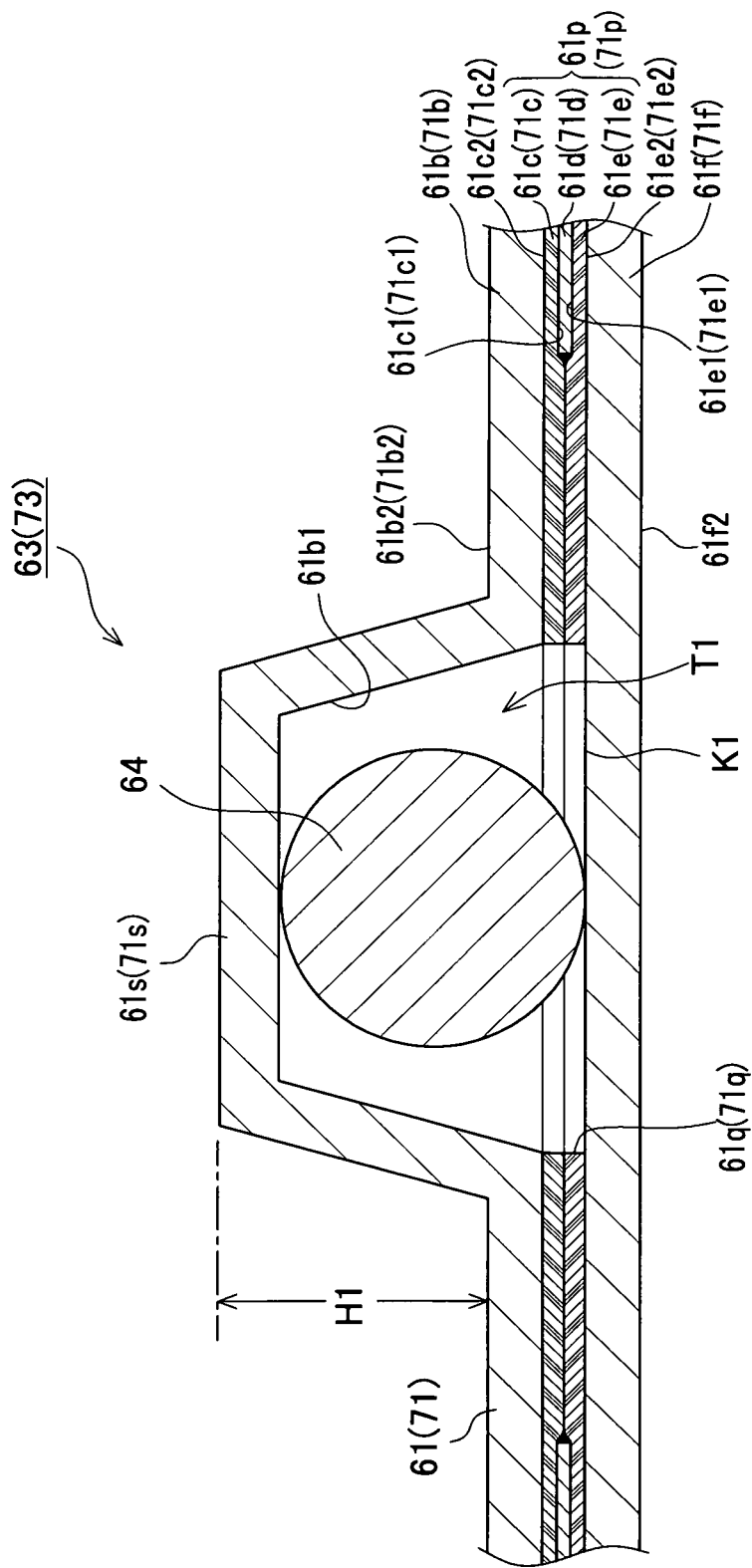
FIG. 8 is a sectional view of the first heater with temperature detecting device (the second heater with temperature detecting device), taken along a line A-A in FIG. 7.

The first laminated heater 61 is a thin sheet heater of a laminated structure, as shown in FIG. 8, including a first insulating resin film 61c, a second insulating resin layer 61e, a heater element 61d interposed between an inner surface 61c1 of the first insulating resin film 61c and an inner surface 61e1 of the second insulating resin film 61e, a first metal sheet 61b laminated on an outer surface 61c2 of the first insulating resin film 61c, and a second metal sheet 61f laminated on an outer surface 61e2 of the second insulating resin film 61e.

Figure 7:
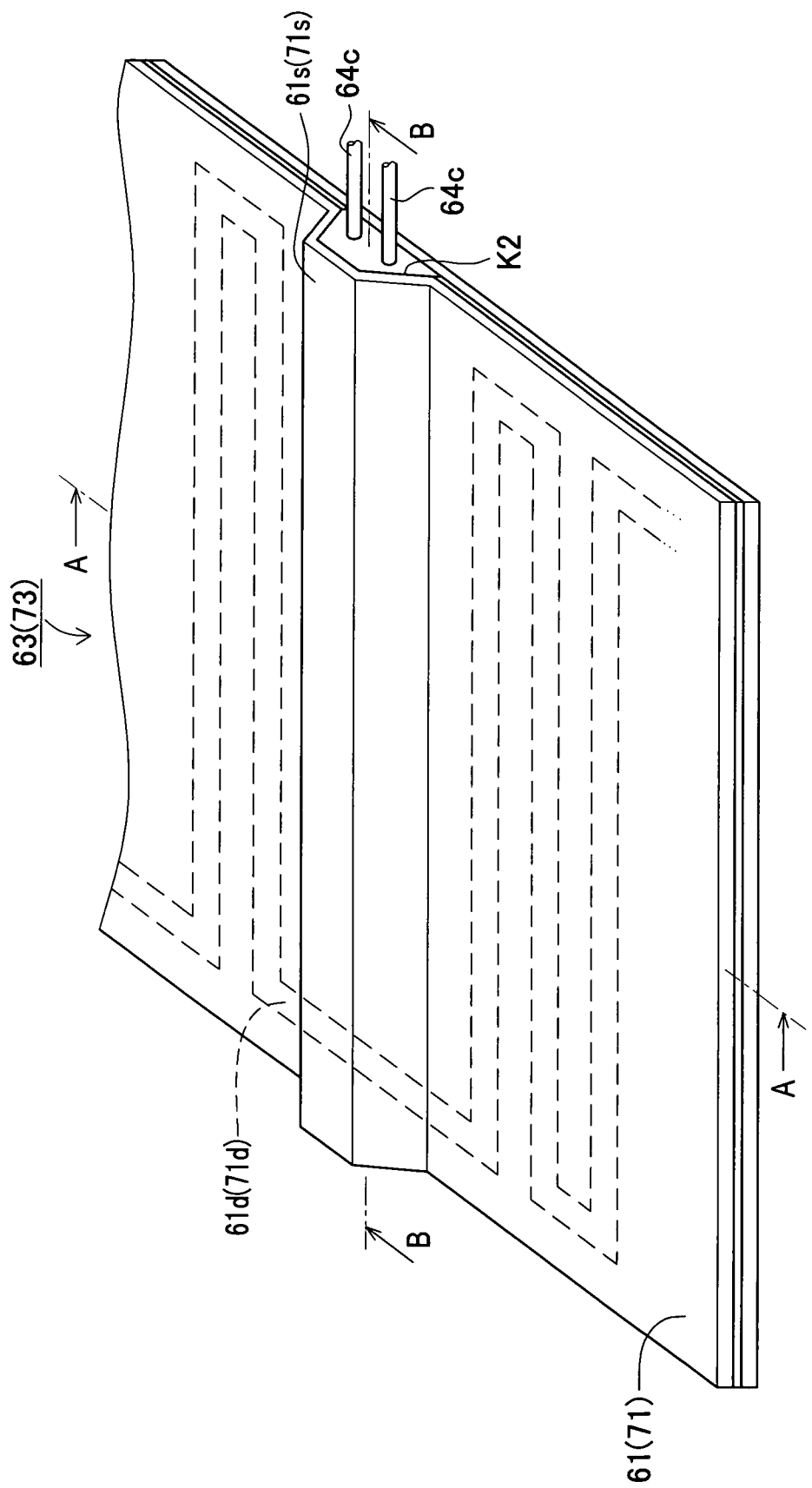
FIG. 7 is a perspective view of a first heater with temperature detecting device (a second heater with temperature detecting device)

The heater element 61d is made of nickel-chromium alloy and extends along a plane in a predetermined pattern indicated by a dotted line in FIG. 7. The first and second insulating resin films 61c and 61e are formed of polyimide films. The first and second metal sheets 61b and 61f are formed of aluminum sheets. The first insulating resin film 61c, the second insulating resin film 61e, the heater element 61d, the first metal sheet 61b, and the second metal sheet 61f are integrally bonded to one another.

In the first heater 63 with temperature detecting device of the present embodiment, the heater element 61d is sandwiched between insulating resin films (the first insulating resin film 61c and the second insulating resin film 61e) and further interposed between two metal sheets (the first metal sheet 61b and the second metal sheet 61f). Accordingly, even when a large external force is exerted on the first heater 63, the heater element 61d and the temperature detecting device 64 can be protected appropriately.

In the first heater 63 of the present embodiment, as shown in FIG. 8, the first metal sheet 61b includes a part protruding outward (upward in FIG. 8) in a direction of lamination of the laminated heater 61 (in a vertical direction in FIG. 8), forming part of a accommodation space T1 for accommodating the temperature detecting device 64. Specifically, part of the first metal sheet 61b forming the laminated sheet heater 61 is formed to protrude outward (upward in FIG. 8) in the lamination direction to accommodate the temperature detecting device 64 inside of the laminated sheet heater 61 (i.e. in the accommodation space T1). Therefore, as an advantage, the temperature detecting device 64 thus held inside of the laminated sheet heater 61 (in the accommodation space T1) is unlikely to be cooled by outside air or the like.

A portion of the first metal sheet 61b protruding outward in the lamination direction (upward in FIG. 8) is referred to as a protruding part 61s.

In the present embodiment, a thermal fuse is used as the temperature detecting device 64. This temperature detecting device 64 is electrically connected in series with the heater element 61d. Accordingly, when the temperature of the temperature detecting device 64 rises to a meltdown temperature of a fuse element not shown placed in the temperature detecting device 64, the fuse element melts and interrupts energization to the heater element 61d. This makes it possible to prevent excessive temperature rising of the laminated heater 61.

In the first heater 63 of the present embodiment, furthermore, the accommodation space T1 in which the temperature detecting device 64 is accommodated includes a through hole 61q formed through a film heater part 61p in which the first insulating resin film 61c, the heater element 61d, and the second insulating resin film 61e are laminated.

Here, a heater with temperature detecting device 83 (see FIG. 11) configured unlike the first heater 63 of the present embodiment may also be adopted. This heater 83 includes a accommodation space T2 having no through hole 61q (see FIG. 8) formed through the film heater part 61p, that is, a accommodation space T2 defined by an inner surface 81b1 of a first metal sheet 81b and an outer surface 61c2 of the first insulating resin film 61. In the heater 83, the temperature detecting device 64 is housed in the accommodation space T2. It should be noted that this heater 83 is also one example of the heater with temperature detecting device according to the present invention.

Figure 11:
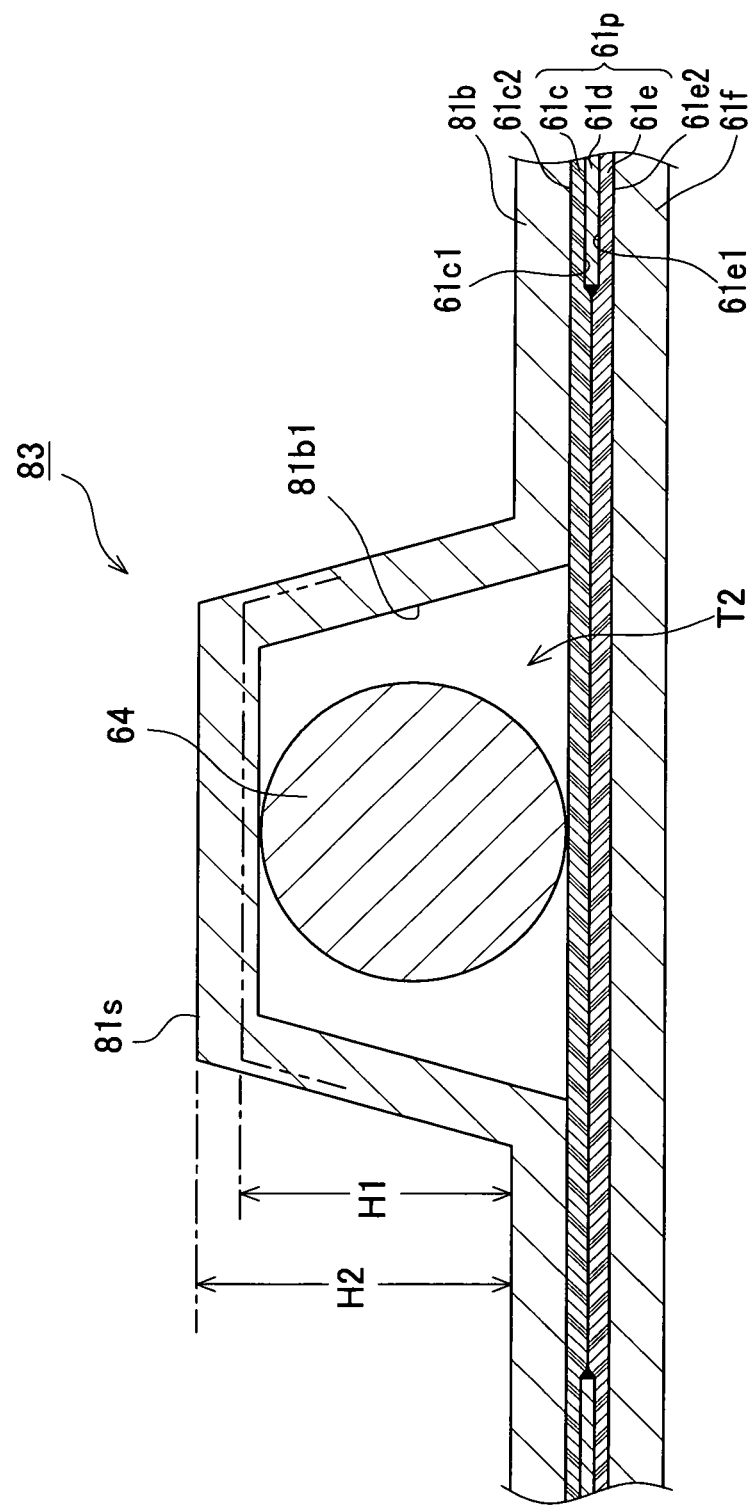
FIG. 11 is a sectional view of a heater with temperature detecting device.

A comparison between the above two heaters with temperature detecting device shows that the first heater 63 can have the protruding part 61s of the first metal sheet 61b that is lower in height as compared with the heater 83 because the through hole 61q is formed through the film heater part 61p. To be specific, as shown in FIG. 11, in the heater 83, the height of the protruding part 81s is set at H2 to provide the accommodation space T2 for accommodating the temperature detecting device 64.

On the other hand, the first heater 63 of the present embodiment having the through hole 61q formed through the film heater part 61p can appropriately accommodate the temperature detecting device 64 in the accommodation space T1 (see FIG. 8) when the height of the protruding part 61s is even as low as H1. Specifically, the height of the protruding part 61s can be reduced by the depth of the through hole 61q (the thickness of the film heater part 61p). The first heater 63 of the present embodiment can have a thinner thickness as compared with the heater with temperature detecting device 83.

The accommodation space T1 in the first heater 63 of the present embodiment includes a first opening K1 formed to open in the outer surface 61e2 of the second insulating resin film 61e. This first opening K1 is closed or covered by the second metal sheet 61f as shown in FIG. 8. It is therefore possible to prevent outside air or the like from entering the accommodation space T1 through the first opening K1. Thus, the temperature detecting device 64 is more unlikely to be cooled by the outside air or the like. It is further possible to prevent water droplets or the like from externally entering the accommodation space T1 through the first opening K1, thereby avoiding short of the temperature detecting device 64 and others. In the present embodiment, the second metal sheet 61f corresponds to a closing member.

In the first heater 63 of the present embodiment, as shown in FIG. 8, the temperature detecting device 64 is accommodated in the accommodation space T1 in such a way as to be in contact with the first and second metal sheets 61*b* and 61*f*. This can achieve good heat conduction from the heater element 61*d* to the temperature detecting device 64. The temperature detecting device 64 is fixed to the first and second metal sheets 61*b* and 61*f* respectively with adhesive not shown. Accordingly, the temperature detecting device 64 can be retained in a stable contact state with the first and second metal sheets 61*b* and 61*f*. With the temperature detecting device 64, therefore, the temperature of the laminated heater 61 (the heater element 61*d*) can be detected stably and accurately. If the temperature of the laminated heater 61 excessively rises, the fuse element not shown placed in the temperature detecting device 64 will melt, thereby properly interrupting the energization to the heater element 61*d*. This makes it possible to prevent excessive temperature rise of the laminated heater 61.

Figure 9:
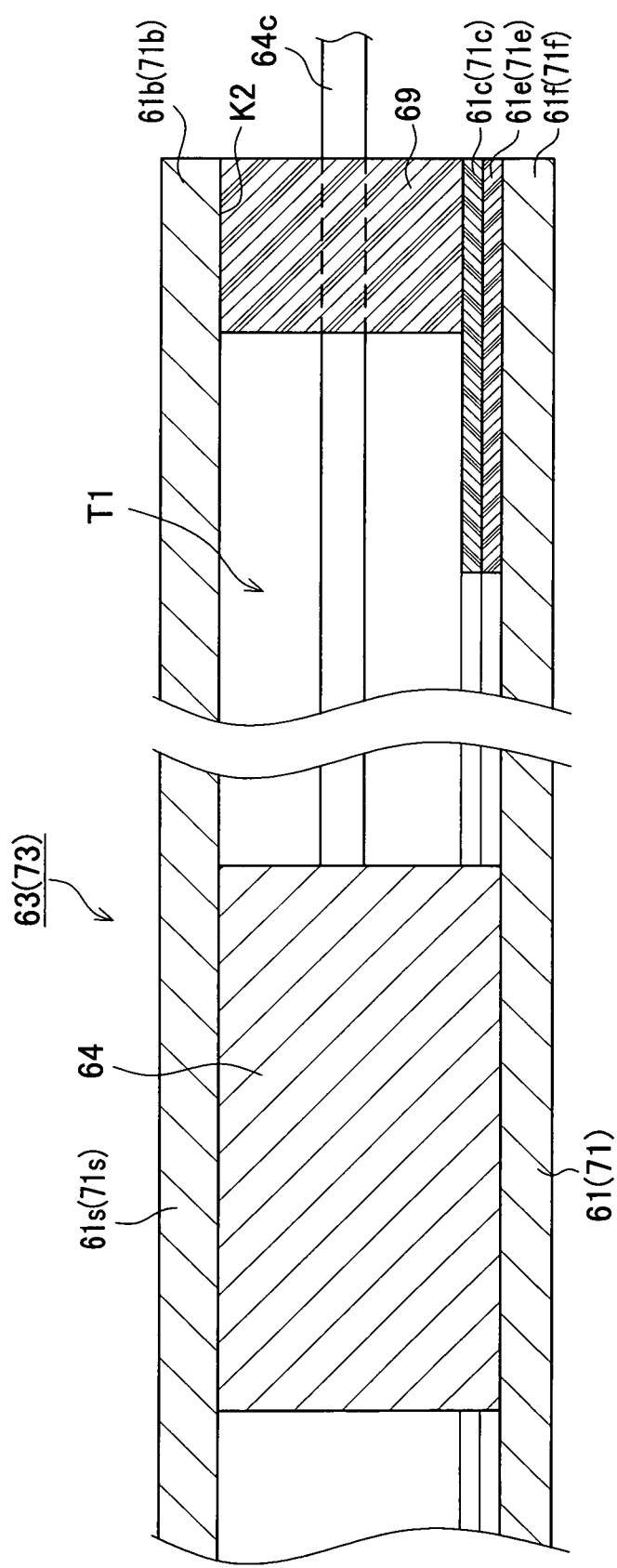
FIG. 9 is another sectional view of the first heater with temperature detecting device (the second heater with temperature detecting device), taken along a line B-B in FIG. 7.

In the first heater 63 of the present embodiment, as shown in FIG. 9, the accommodation space T1 includes a second opening K2 opening in a direction perpendicular to the lamination direction (in a lateral direction in FIG. 9). Thus, a lead wire 64*c* electrically connected to the temperature detecting device 64 can be provided extending out of the accommodation space T1 through the second opening K2. As shown in FIG. 9, further, the second opening K2 is sealed by a sealing member 69 (silicone resin in the present embodiment), whereby preventing outside air or the like from entering the accommodation space T1 through the second opening K2. With the temperature detecting device 64, accordingly, the temperature of the first laminated heater 61 can be detected accurately. Since it is possible to prevent water droplets or the like from externally entering the accommodation space T1, any defects such as short can be avoided.

The first sheet 62 is a urethane foam sheet, which is placed between the first heater 63 and the first holding member 65. This first sheet 62 is elastically deformable in a direction of thickness of the first heater 61 (in a vertical direction in FIG. 6).

The first holding member 65 is formed in recessed rectangular shape, including a holding part 65*c* internally holding the first heater 61 and a rectangular annular flange 65*b* formed around an open end of the holding part 65*c*. This flange 65*b* is formed with a plurality of through holes 65*d* each allowing a threaded portion 12*b* of a mounting bolt 12 to pass through.

The bottom wall 34*b* of the second housing member 30 is formed with threaded holes 34*c* in positions corresponding to the through holes 65*d* of the first heater unit 60. Each of the threaded holes 34*c* is configured to threadably engage with the threaded portion 12*b* of the mounting bolt 12. In the present embodiment, the threaded portion 12*b* of the mounting bolt 12 is inserted through the through hole 65*d* of the flange 65*b* and tightened in the threaded hole 34*c* of the bottom wall 34*b* of the second housing member 30, thereby detachably fixing the first heater unit 60 to an outer surface 34*f* of the bottom wall 34*b* of the second housing member 30.

As explained above, the first heater unit 60 is detachably provided outside the housing case 40 (i.e., on the outer surface 34*f* of the bottom wall 34*b* of the second housing member 30). Accordingly, the first heater unit 60 can easily be detached from and attached to the housing case 40 of the battery pack 50. This configuration can improve workability in maintenance, replacement, or the like for the first heater 63.

Meanwhile, the heated surface 35*b* of the battery pack 50 includes a flat surface 35*c* to be heated and a recess 35*d* which is depressed into the battery pack 50 (into the space S) as shown in FIG. 6. When the first heater unit 60 is fixed to the bottom wall 34*b* of the second housing member 30, the protruding part 61*s* of the first heater 63 is received in the recess 35*d* of the heated surface 35*b*, and the outer surface 61*b*2 of the first metal sheet 61*b* can be placed in contact with the flat surface 35*c* of the heated surface 35*b*. Thus, the temperature detecting device 64 can be held in the recess 35*d* of the heated surface 35*b*, so that the temperature detecting device 64 is unlikely to be cooled by the outside air or the like and the temperature of the first laminated heater 61 can more accurately detected.

In the present embodiment, the recess 35*d* of the heated surface 35*b* is shaped by press molding in such a way that part of the bottom 34*b* of the second housing member 30 is deformed to be depressed. The strength of the bottom wall 34*b* of the second housing member 30 can also be enhanced.

In the present embodiment, the first sheet 62 is interposed between the first heater 63 and the first holding member 65 while the first sheet 62 is elastically deformed in a compressive state in the direction of thickness of the first heater 63 (in the vertical direction in FIG. 6). By the elastic force deriving from the elastically compressive deformation of the first sheet 62, the outer surface 61*b*2 of the first metal sheet 61*b* is placed in close contact with the flat surface 35*c* to be heated. Thus, no gap is formed between the outer surface 61*b*2 of the first metal sheet 61*b* and the flat surface 35*c*, so that the battery pack 50 can be heated appropriately by the first heater 63.

Furthermore, the heat of the first laminated heater 61 can be appropriately conducted to the battery pack 50, thereby preventing the temperature of the first laminated heater 61 from excessively increasing.

The second heater unit 70 includes a second heater with temperature detecting device 73 (hereinafter, referred to as a "second heater 73"), a second sheet 72, a second holding member 75 that holds them, and a heat insulating material 78, as shown by reference codes in parentheses in FIG. 6. Similar to the first heater unit 60, this second heater unit 70 is constituted of the second heater 73, the second sheet 72, the second holding member 75, and the heat insulating member 78 which are integrally bonded to one another.

The second heater 73 includes a second laminated sheet heater 71 (see FIG. 7) and a temperature detecting device 64.

The second laminated sheet heater 71 is a thin sheet heater of a laminated structure, as shown by reference codes in parentheses in FIG. 8, including a first insulating resin film 71*c*, a second insulating resin film 71*e*, a heater element 71*d* interposed between an inner surface 71*c*1 of the first insulating resin film 71*c* and an inner surface 71*e*1 of the second insulating resin film 71*e*, a first metal sheet 71*b* laminated on an outer surface 71*c*2 of the first insulating resin film 71*c*, and a second metal sheet 71*f* laminated on an outer surface 71*e*2 of the second insulating resin film 71*e*.

In the second heater 73, as with the first heater 63, the heater element 71*d* is sandwiched between insulating resin films (the first insulating resin film 71*c* and the second insulating resin film 71*e*) and further interposed between two metal sheets (the first metal sheet 71*b* and the second metal sheet 71*f*). Accordingly, even when a large external force is exerted on the second temperature detecting device 73, the heater element 71*d* and the temperature detecting device 64 can be protected appropriately.

In the second heater 73, similar to the first heater 63, the first metal sheet 71*b* includes a part protruding outward (upward in FIG. 8) in a direction of lamination of the laminated heater 71 (in a vertical direction in FIG. 8), forming part of an accommodation space T1 for accommodating the temperature detecting device 64. Specifically, part of the first metal sheet 71*b* forming the laminated sheet heater 71 is formed to protrude outward (upward in FIG. 8) in the lamination direction to accommodate the temperature detecting device 64 inside of the laminated sheet heater 71 (i.e. in the accommodation space T1). Therefore, as an advantage, the temperature detecting device 64 thus held inside of the laminated sheet heater 71 (in the accommodation space T1) is unlikely to be cooled by outside air or the like. A portion of the first metal sheet 71*b* protruding outward in the lamination direction (upward in FIG. 8) is referred to as a protruding part 71*s*.

In the second heater 73, similar to the first heater 63, the accommodation space T1 in which the temperature detecting device 64 is accommodated includes a through hole 71*q* formed through a film heater part 71*p* in which the first insulating resin film 71*c*, the heater element 71*d*, and the second insulating resin film 71*e* are laminated. As an advantage, the second heater 73 as with the first heater 63 can have a thinner thickness as compared with the heater with temperature detecting device 83 (see FIG. 11).

In the second heater 73, similar to the first heater 63, a first opening K1 is closed or covered by the second metal sheet 71*f*. It is therefore possible to prevent outside air or the like from entering the accommodation space T1 through the first opening K1. Thus, the temperature detecting device 64 is more unlikely to be cooled by the outside air or the like. It is further possible to prevent water droplets or the like from externally entering the accommodation space T1 through the first opening K1, thereby avoiding short of the temperature detecting device 64 and others. In the present embodiment, the second metal sheet 71*f* corresponding to the closing member.

In the second heater 73, similarly, as shown in FIG. 8, the temperature detecting device 64 is accommodated in the accommodation space T1 and held in contact with the first and second metal sheets 71*b* and 71*f*. This can achieve good heat conduction from the heater element 71*d* to the temperature detecting device 64. The temperature detecting device 64 is fixed to the first and second metal sheets 71*b* and 71*f* respectively with adhesive not shown. Accordingly, the temperature detecting device 64 can be retained in a stable contact state with the first and second metal sheets 71*b* and 71*f*. With the temperature detecting device 64, therefore, the temperature of the laminated heater 71 (the heater element 71*d*) can be detected stably and accurately. If the temperature of the laminated heater 71 excessively rises, the fuse element not shown placed in the temperature detecting device 64 will melt, thereby properly interrupting the energization to the heater element 71*d*. This makes it possible to prevent excessive temperature rise of the laminated heater 71.

In the second heater 73, similarly, as shown in FIG. 9, the accommodation space T1 includes a second opening K2 opening in a direction perpendicular to the lamination direction (in a lateral direction in FIG. 9). Thus, a lead wire 64*c* electrically connected to the temperature detecting device 64 can be provided extending out of the accommodation space T1 through the second opening K2. The second opening K2 is sealed by a sealing member 69 (silicone resin in the present embodiment), whereby preventing outside air or the like from entering the accommodation space T1 through the second opening K2. With the temperature detecting device 64, accordingly, the temperature of the second laminated heater 71 can be detected accurately. Since it is possible to prevent water droplets or the like from externally entering the accommodation space T1, any defects such as short can be avoided.

As indicated by parentheses in FIG. 6, as with the first heater unit 60, the second heater unit 70 is also detachably provided outside the housing case 40 (i.e., on the outer surface 34*f* of the bottom wall 34*b* of the second housing member 30). Accordingly, the second heater unit 70 can easily be detached from and attached to the housing case 40 of the battery pack 50. This configuration can improve workability in maintenance, replacement, or the like for the second heater 73.

When the second heater unit 70 is fixed to the bottom wall 34*b* of the second housing member 30, as indicated by parentheses in FIG. 6, the protruding part 71*s* of the second heater 73 is received in the recess 35 of the heated surface 35*b*, and the outer surface 71*b*2 of the first metal sheet 71*b* can be placed in contact with the flat surface 35*c* of the heated surface 35*b*. Thus, the temperature detecting device 64 can be held in the recess 35*d* of the heated surface 35*b*, so that the temperature detecting device 64 is not likely to be cooled by the outside air or the like and the temperature of the second laminated heater 71 can more accurately detected.

Furthermore, the second sheet 72 is interposed between the second laminated heater 71 and the second holding member 75 while the second sheet 72 is elastically deformed in a compressive state in the direction of thickness of the second laminated heater 71 (in the vertical direction in FIG. 6). By the elastic force deriving from the elastically compressive deformation of the second sheet 72, the outer surface 71*b*2 of the first metal sheet 71*b* is placed in close contact with the flat surface 35*c* to be heated. Thus, no gap is formed between the outer surface 71*b*2 of the first metal sheet 71*b* and the flat surface 35*c*, so that the battery pack 50 can be heated appropriately by the second laminated heater 71. Furthermore, the heat of the second laminated heater 71 can be appropriately conducted to the battery pack 50, thereby preventing the temperature of the second laminated heater 71 from excessively increasing.

The first heater 63 and the second heater 73 are heaters that can be energized to heat by a household AC power source. Both heaters are electrically connected to an alternator plug 15 as shown in FIG. 3. When the alternator plug 15 is plugged in an outlet of the household AC power source, the first and second heaters 63 and 73 are supplied with electric power to generate heat.

Next, a heating function of the heater-equipped battery structure 10 will be described in detail.

In the heater-equipped battery structure 10 of the present embodiment, as mentioned above, the first heater 63 and the second heater 73 are placed on the outer surface 35*b* of the spaced part 35 of the second housing member 30 (the housing case 40) (see FIG. 3). This configuration allows the heat of the first laminated heater 61 and the second laminated heater 71 to be conducted to the spaced part 35, thus heating the air in the space S through the heated spaced part 35. Then, each secondary battery 100 is exposed to the heated air and heated.

According to the above heating manner, it is possible to prevent uneven heating among the secondary batteries 100 of the battery pack 50 and thus reduce variations in temperature among the secondary batteries 100. This makes it possible to reduce variations in output characteristics among the secondary batteries 100. The entire battery pack 50 in which the secondary batteries 100 are connected in series to one another can therefore produce stable outputs.

In the first heater 63, the temperature of the first laminated heater 61 can be accurately detected by the temperature detecting device 64. If the temperature of the first laminated heater 61 excessively rises due to any failures, the fuse element not shown in the temperature detecting device 64 will melt and the energization to the heater element 61*d* is appropriately cut out. This makes it possible to prevent excessive temperature rise of the first laminated heater 61 and hence avoid excessive temperature rise of each secondary battery 100 constituting the battery pack 50. Such energization control can also be applied to the second heater 73.

In the present embodiment, furthermore, the space S exists in addition to the spaced part 35 between each of the first and second heaters 63 and 73 and each of the secondary batteries 100. The temperature of each secondary battery 100 can be further prevented from excessively rising.

The first heater unit 60 of the present embodiment is provided with the heat insulating member 68 under a lower surface 65g of the holding member 65 opposite the holding surface 65f as shown in FIG. 6. Similarly, the second heater unit 70 is provided with the insulating member 78 under a lower surface 75g (a lower surface in FIG. 6) of the holding member 75 opposite a holding surface 75f holding the second heater 71. Accordingly, the heat of the first and second laminated heaters 61 and 71 are unlikely to escape from the lower surfaces 65g and 75g of the holding members 65 and 75.

Figure 10:
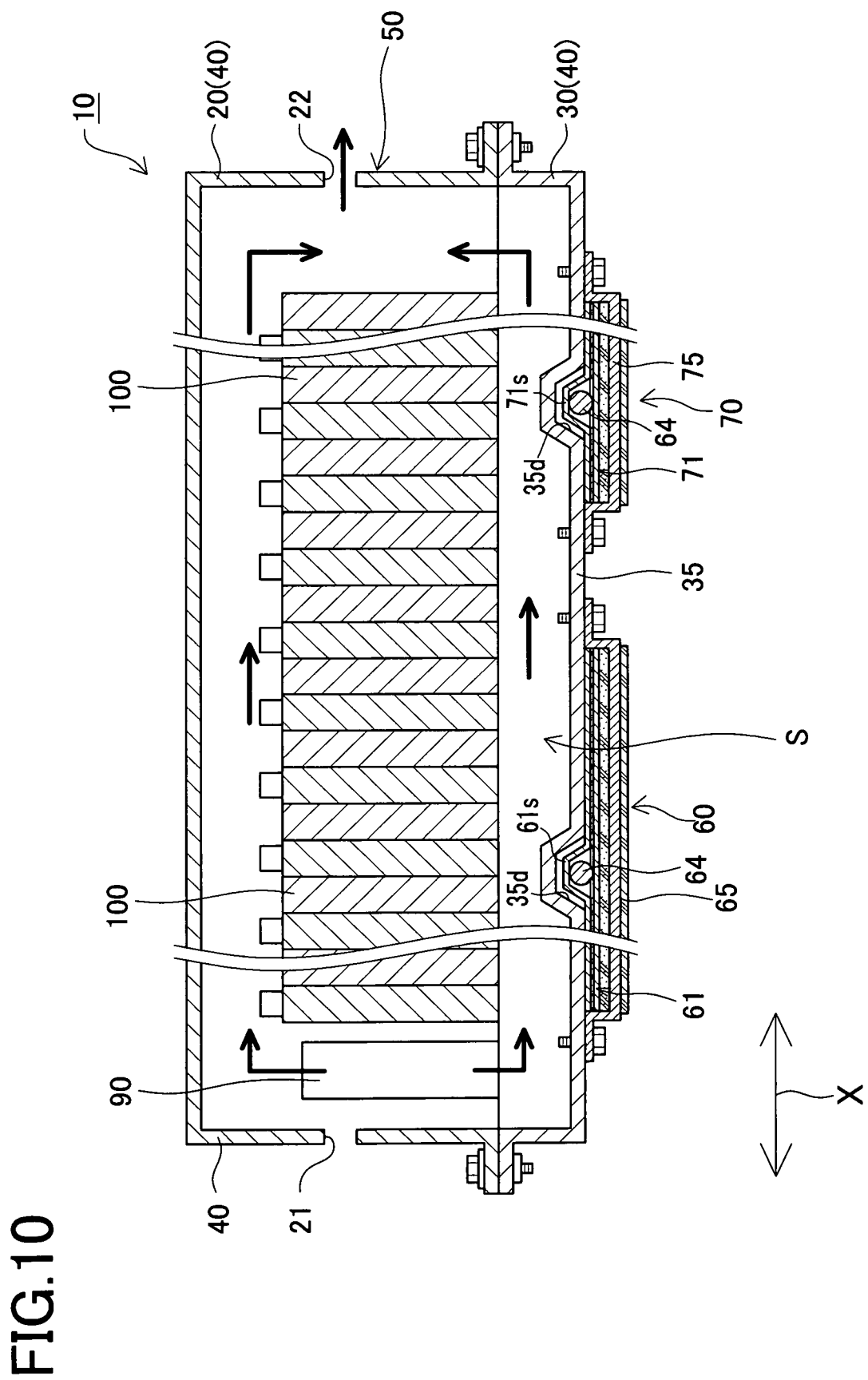
FIG. 10 is an explanatory view to explain a cooling function of a battery structure with heater, taken along the line P-P in FIG. 1.

In the heater-equipped battery structure 10 of the present embodiment, as shown in FIG. 3, a cooling device 90 is placed in the housing case 40. If the temperatures of the secondary batteries 100 rise to high temperatures, the cooling device 90 is operated to cool the secondary batteries 100. More specifically, as shown in FIG. 10, upon activation, the cooling device 90 takes in outside air through a first air hole 21 of the first housing member 20, delivers cooled air (outside air) through the inside of the housing case 40 including the space S, and discharges the heat of the secondary batteries 100 out of the battery structure 10 through a second air hole 22. Thus, each of the secondary batteries 100 can be cooled appropriately. In the present embodiment, particularly, no heater exists between each secondary battery 100 and the air passage (including the space S) and therefore each secondary battery 100 can be cooled efficiently.

MODIFIED EXAMPLE 1

Modified example 1 is different in a heater with temperature detecting device from the above embodiment and is similar in other components. Accordingly, the following description will be made on the differences from the above embodiment, and the explanation of similar parts are omitted or simplified.

In the first heater 63 of the above embodiment, specifically, the accommodation space T1 includes the through hole 61q formed through the film heater part 61p, and the first opening K1 of the accommodation space T1 is closed by the second metal sheet 61f as shown in FIG. 8.

Figure 12:
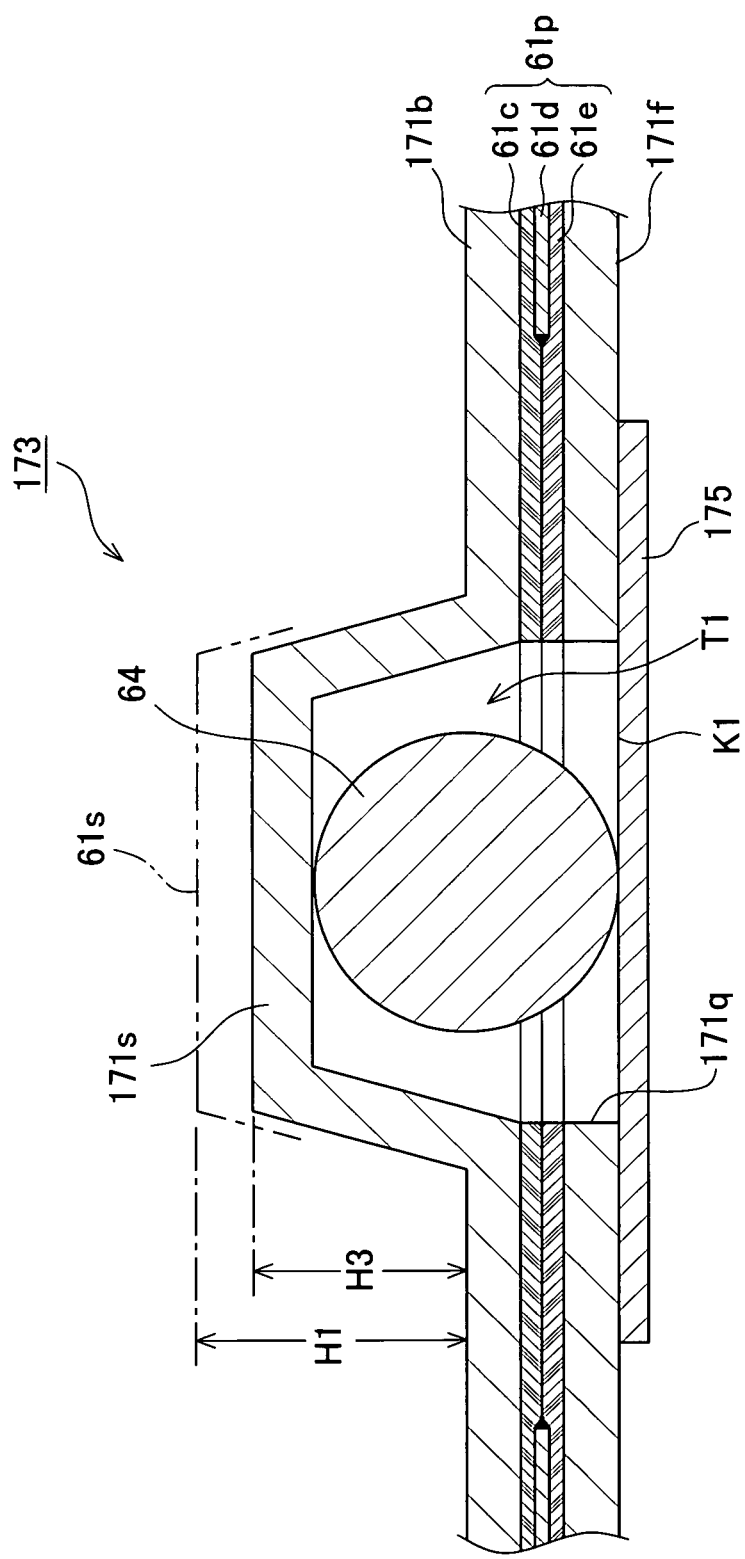
FIG. 12 is a sectional view of a heater with temperature detecting device in a first modified example.

On the other hand, in a first heater with temperature detecting device 173 of the modified example 1, a accommodation space T1 includes a through hole 171q formed through not only the film heater part 61p but also a second metal sheet 171f as shown in FIG. 12. In the first heater 173 of the modified example 1, accordingly, the height of a protruding part 171s of a first metal sheet 171b can be reduced as compared with the first heater 63 of the above embodiment.

To be more specific, in the first heater 63 of the above embodiment, as shown in FIG. 8, the height of the protruding part 61s is set at H1 to place the temperature detecting device 64 in the accommodation space T1. In the first heater 173 of the modified example 1, on the other hand, the accommodation space T1 includes the through hole 171q formed through not only the film heater part 61p but also the second metal sheet 171f As shown in FIG. 12, the height of the protruding part 171s can be reduced to even as low as H3. In other words, the height of the protruding part 171s can be lowered by the thickness of the second metal sheet 171f. The first heater 173 of the modified example 1 is more desirable because of a thinner thickness as compared with the first heater 63 of the above embodiment. The same applies to the second heater with temperature detecting device.

In the modified example 1, the first opening K1 of the accommodation space T1 is closed by a closing member 175. This makes it possible to prevent outside air or the like from entering the accommodation space T1 through the first opening K1, so that the temperature detecting device 64 is unlikely to be cooled by the outside air or the like. It is further possible to prevent water droplets or the like from externally entering the accommodation space T1 through the first opening K1, thereby avoiding short of the temperature detecting device 64 or the like.

In the modified example 1, aluminum adhesive tape made of an aluminum film and an adhesive layer (not shown) is used as the closing member 175.

MODIFIED EXAMPLE 2

Modified example 2 is different in a heater with temperature detecting device from the above embodiment and is similar in other components. Accordingly, the following description will be made on the differences from the above embodiment, and the explanation of similar parts are omitted or simplified.

In the first heater 63 of the above embodiment, specifically, the temperature detecting device 64 is accommodated in the accommodation space T1 as shown in FIG. 8. On the other hand, in a first heater with temperature detecting device 183 of the modified example 2, a temperature detecting device 184 instead of the temperature detecting device 64 is housed in the accommodation space T1.

The temperature detecting device 184 of the modified example 2, different from the temperature detecting device 64 of the above embodiment, includes a columnar main body 184b including a temperature detecting element not shown and a cylindrical elastic coating 184c that coats the main body 184b. This elastic coating 184c is made of silicone rubber which is good in heat conductivity and has elasticity. The main body 184b of the temperature detecting device 184 has a configuration equivalent to the temperature detecting device 64 of the above embodiment. Accordingly, the temperature detecting device 184 of the modified example 2 is larger in diameter by the thickness of the elastic coating 184c as compared with the temperature detecting device 64 of the above embodiment.

In the modified example 2, therefore, as with part of the first metal sheet 181b, part of the second metal sheet 181f is formed to protrude outward in the lamination direction (downward in FIG. 13) to provide a wider accommodation space T1 for accommodating the temperature detecting device 184. The temperature detecting device 184 can thus be accommodated in the accommodation space T1 appropriately.

Figure 13:
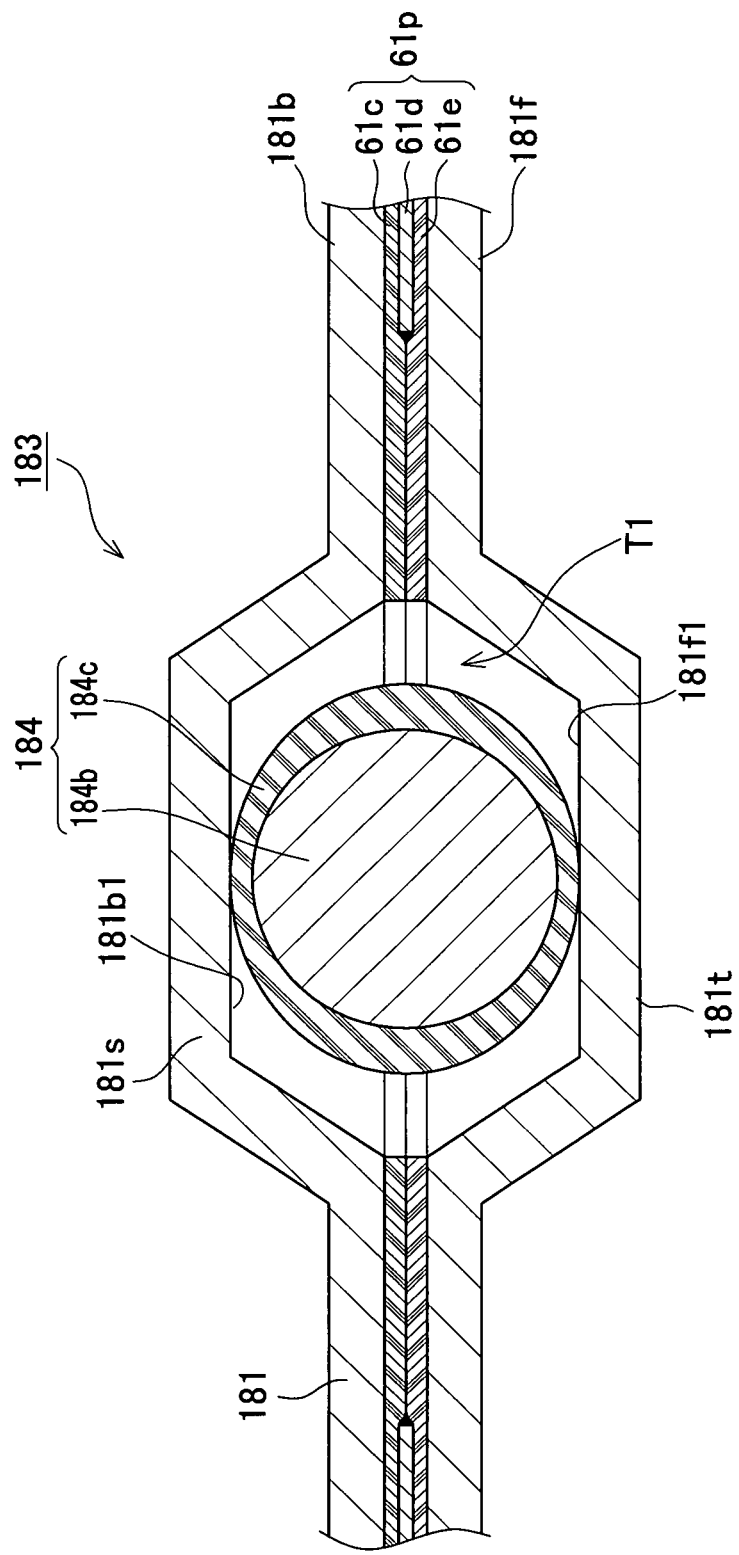
FIG. 13 is a sectional view of a heater with temperature detecting device in a second modified example.

In the modified example 2, particularly, the elastic coating 184c of the temperature detecting device 184 is elastically deformed in a compressive state in the lamination direction (in a vertical direction in FIG. 13) in the accommodation space T1 as shown in FIG. 13. With the elastic force deriving from such elastically compressive deformation, the elastic coating 184c presses against the inner surface of the laminated heater 181 (i.e. an inner surface 181b1 of the first metal sheet 181b and an inner surface 181f1 of the second metal sheet 181f) defining the accommodation space T1, thereby fixing the temperature detecting device 184 in the accommodation space T1. Consequently, without the need for additionally providing a fixing member to fix the temperature detecting device 184, the temperature detecting device 184 can be stably accommodated in the accommodation space T1 appropriately.

The temperature detecting device 184 is elastically accommodated in the accommodation space T1 as above. Accordingly, even where the first heater 183 of the modified example 2 is used in an environment where vibrations is liable to occur (e.g. in the case where the battery structure with the first heater 183 of the modified example 2 is mounted in a vehicle), the temperature detecting device 184 can be stably accommodated in a fixed state in the accommodation space T1. Thus, the temperature of the laminated heater 181 can be detected by the temperature detecting device 184. The same applies to the second heater with temperature detecting device.

MODIFIED EXAMPLE 3

Modified example 3 is different in a heater with temperature detecting device from the above embodiment and is similar in other components. Accordingly, the following description will be made on the differences from the above embodiment, and the explanation of similar parts are omitted or simplified.

Figure 14:
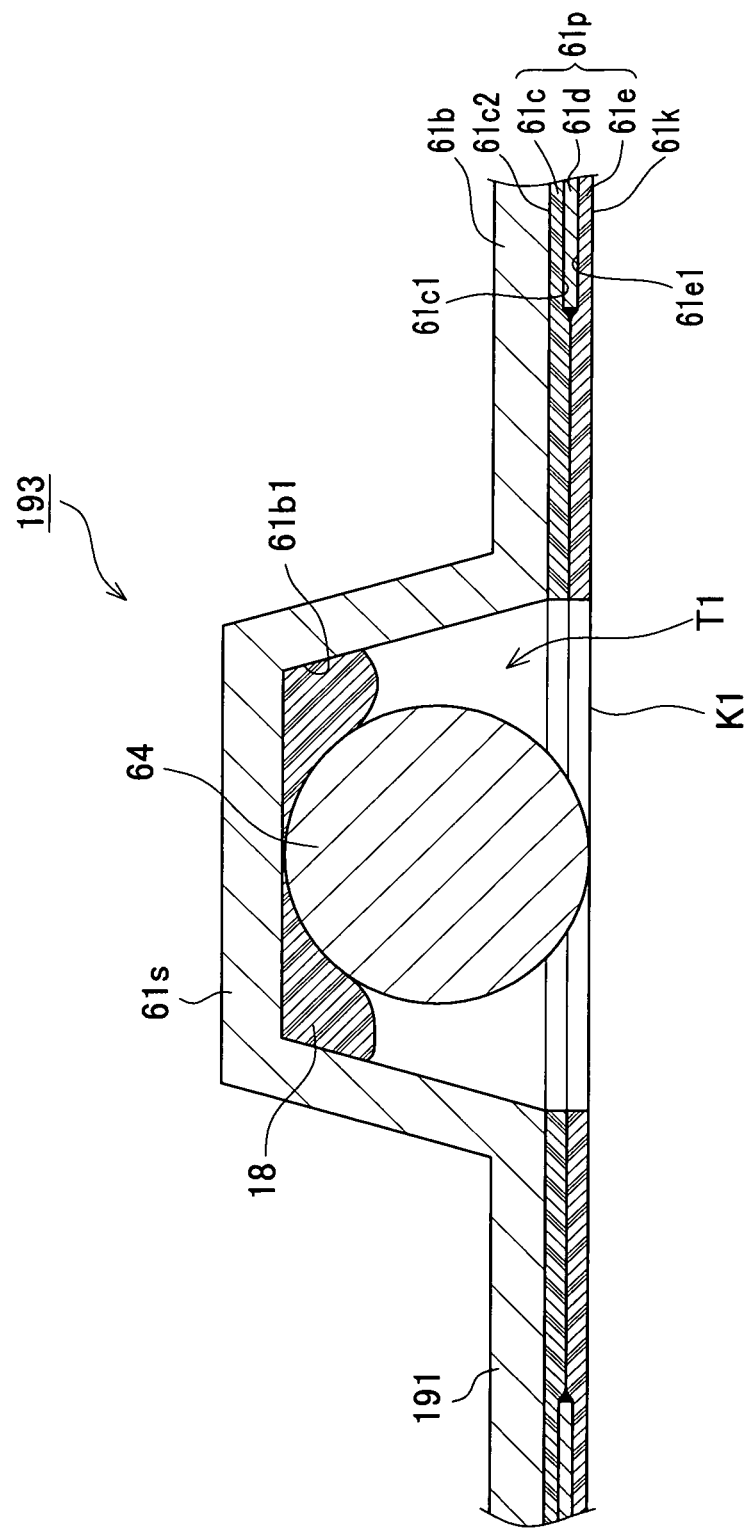
FIG. 14 is a sectional view of a heater with temperature detecting device in a third modified example.

A first heater with temperature detecting device 193 of the modified example 3, unlike the first heater 163 of the above embodiment, does not have the second metal sheet 61*f* as shown in FIG. 14. The first heater 193 of the modified example 3 can have a thickness thinner by the thickness of the second metal sheet 61*f* than the first heater 63 of the above embodiment. It should be noted that the temperature detecting device 64 is fixed to the inner surface 61*b*1 of the first metal sheet 61*b* (the protruding part 61*s*) with adhesive 18.

Figure 15:
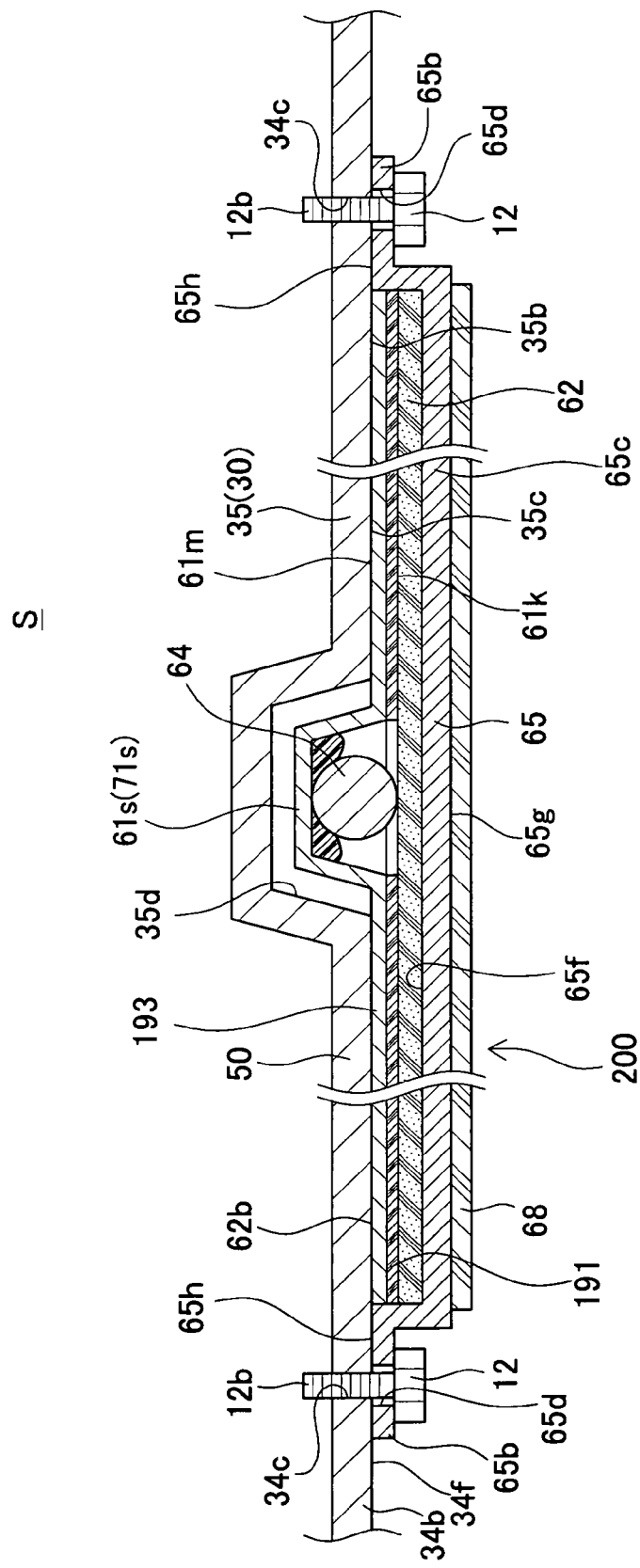
FIG. 15 is a sectional view of a first heater unit in the third modified example.

In the first heater 193 of the modified example 3, meanwhile, the first opening K1 is not closed but opens in the outer surface 61*e*2 of the second insulating resin film 61*e*. However, the first heater 193 of the modified example 3 is integrally coupled to the first sheet 62 and the first holding member 65 with adhesive to constitute a heater unit 200 as shown in FIG. 15. Accordingly, the first opening K1 can be closed indirectly by the first holding member 65 through the first sheet 62.

The above configuration can prevent outside air or the like from entering the accommodation space T1 through the first opening K1, thus avoiding cooling of the temperature detecting device 64 by outside air or the like. It is further possible to prevent water droplets or the like from entering the accommodation space T1 through the first opening K1, thereby avoiding short of the temperature detecting device 64 and others. It is possible to prevent the temperature detecting device 64 from becoming damaged by a mounting tool or the like in the work for mounting the heater unit 200 of the modified example 3 to the housing case 40 of the battery pack 50. The same applies to the second heater with temperature detecting device.

The present invention is described as above referring to the preferred embodiment and modified examples 1 to 3 but it is not limited to the aforementioned description. The present invention may be embodied in other specific forms without departing from the essential characteristics thereof.

For instance, in the above embodiment and modified examples, the battery structure to be heated is explained as the battery pack 50 including the plurality (forty in the embodiment) of secondary batteries 100 and the housing case 40 that houses them. Alternatively, the battery structure may be a cell, a battery module, etc. In other words, a configuration to directly heat a cell, a battery module, etc. by a heater may be adopted.

The above embodiment and others exemplify the battery module as the secondary battery 100. As an alternative, the secondary battery may be a cell.

Although the above embodiment and others use the secondary battery 100 provided with the resin battery case 101 and others, the battery case may be made of any materials such as metal as well as resin. The above embodiment and others use a nickel-metal hydride storage sealed battery. Alternatively, the present invention can be applied to the case where another battery such as a lithium-ion battery (including a primary cell) is used Further, although the thermal fuse is used as the temperature detecting device in the above embodiment and others, a PTC thermistor and a temperature sensor (including a thermistor, a thermocouple, etc.) may be used.

In the above embodiment and others, the outer surface 61*b*2 of the first metal sheet 61*b* and others are placed in contact with the flat surface 35*c* of the heated surface 35*b*. Alternatively, the first heater 63 and others may be turned upside down to place the outer surface 61*f*2 of the second metal sheet 61*f* and others in contact with the flat surface 35*c* of the heated surface 35*b*.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A battery structure with heater, comprising:
    a battery structure being a battery pack including a plurality of cells or battery modules and a housing case accommodating the plurality of cells or battery modules, an outer surface of the housing case including a surface to be heated; and
    a heater for heating the plurality of cells or battery modules by heating the surface to be heated; wherein
    the surface to be heated includes:
        a flat part to be heated, and
        a recessed portion that is a recess in an outer surface of the surface to be heated, being recessed toward an inside direction of the battery structure, and that defines, via an inner surface of the surface to be heated, a protrusion that projects into an inside space of the battery structure in a same direction as the recess;
    the heater is a heater with a temperature detecting device, including:
        a laminated heater including:
            a first insulating resin film,
            a second insulating resin film,
            a heater element made of metal foil, the heater element being interposed between a first surface of the first insulating resin film and a first surface of the second insulating resin film, and
            a first metal sheet laminated on a second surface of the first insulating resin film;
    the first metal sheet partly forms a protruding part on a first surface opposite from a second surface that is laminated with the second surface of the first insulating resin film to provide at least an accommodation space in which the temperature detecting device is accommodated;

the temperature detecting device is thicker in a thickness direction of the laminated heater than the entire laminated heater at a portion where the protruding part does not exist;

the accommodation space includes a through hole formed through a film heater part in which the first insulating resin film, the second insulating resin film, and the heater element are laminated; and the heater with the temperature detecting device is arranged such that the protruding part of the first metal sheet is received in the recessed portion of the surface to be heated, and the first surface of the first metal sheet is placed in direct contact with the flat part to be heated.

2. The battery structure with heater according to claim 1, wherein
the laminated heater includes a second metal sheet laminated on a second surface of the second insulating resin film.

3. The battery structure with heater according to claim 1, wherein the accommodation space includes a first opening formed in the second surface of the second insulating resin film, and
the heater with the temperature detecting device further comprises a closing member that closes the first opening.

4. The battery structure with heater according to claim 1, wherein
the temperature detecting device is accommodated in the accommodation space in such a way as to be in contact with the first metal sheet.

5. The battery structure with heater according to claim 2, wherein
the temperature detecting device is accommodated in contact with at least one of the first metal sheet and the second metal sheet in the accommodation space.

6. The battery structure with heater according to claim 1, wherein
the temperature detecting device includes:
a main body including a temperature detecting element; and
an elastic coating that has heat conductivity and elasticity and coats the main body,
wherein the elastic coating is elastically deformed in a compressive state to fix the temperature detecting device in the accommodation space.

7. The battery structure with heater according to claim 1, further comprising:
a holding member that holds the heater, wherein the holding member is configured to mount the heater unit to the battery structure.

8. The battery structure with heater according to claim 1, wherein
the outer surface of the surface to be heated faces a direction away from the plurality of cells or battery modules, and
the inner surface of the surface to be heated faces a direction toward the plurality of cells or battery modules.

9. The battery structure with heater according to claim 1, wherein:
the plurality of cells or battery modules are disposed in a direction toward which the protrusion projects and are disposed above the entirety of the recessed portion.

10. The battery structure with heater according to claim 1, wherein:
the plurality of cells or battery modules and a wall portion of the housing case, the wall portion including the surface to be heated, are separated or spaced from each other with a space interposed therebetween.

11. The battery structure with heater according to claim 5, wherein
the temperature detecting device is fixed in contact with at least one of the first metal sheet and the second metal sheet in the accommodation space.

12. The battery structure with heater according to claim 2, wherein the accommodation space includes a through hole formed through the second metal sheet and a film heater part in which the first insulating resin film, the second insulating resin film, and the heater element are laminated.

13. The battery structure with heater according to claim 4, wherein
the temperature detecting device is fixed in contact with the first metal sheet in the accommodation space.

14. The battery structure with heater according to claim 1, wherein
the accommodation space includes a second opening formed to open in a direction perpendicular to a lamination direction, and
the heater with temperature detecting device further comprises:
a lead wire electrically connected to the temperature detecting device and placed extending out of the accommodation space through the second opening; and
a sealing member that seals the second opening.

15. The battery structure with heater according to claim 12, wherein
the accommodation space includes a first opening formed in a first surface of the second metal sheet, and
the heater with temperature detecting device further comprises a closing member that closes the first opening.

* * * * *